US012623575B2

(12) United States Patent
Hewitt et al.

(10) Patent No.: US 12,623,575 B2
(45) Date of Patent: May 12, 2026

(54) HEAD IMPACT ENERGY ABSORPTION COMPONENT WITH INTEGRATED SEAT TRIM SUPPORT

(71) Applicant: TOYOTA MOTOR ENGINEERING & MANUFACTURING NORTH AMERICA, INC., Plano, TX (US)

(72) Inventors: Brian J. Hewitt, Brighton, MI (US); Arpit D. Bhatt, Canton, MI (US); Andrew G. Schulte, Ypsilanti, MI (US); Mark E. Neumann, Brighton, MI (US); Kyle E. Rosander, Saline, MI (US); Charles Patterson, Carleton, MI (US); Alexander W. Schuyler, Ann Arbor, MI (US); Jennifer Lyn Pelky, Brighton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 193 days.

(21) Appl. No.: 18/486,806

(22) Filed: Oct. 13, 2023

(65) Prior Publication Data

US 2025/0121750 A1    Apr. 17, 2025

(51) Int. Cl.
*B64D 11/06* (2006.01)
*B60N 2/42* (2006.01)
*B60N 2/58* (2006.01)

(52) U.S. Cl.
CPC ............ *B60N 2/4249* (2013.01); *B60N 2/58* (2013.01); *B64D 11/0619* (2014.12)

(58) Field of Classification Search
CPC . B60N 2/4249; B60N 2/4256; B64D 11/0619
See application file for complete search history.

(56) References Cited

U.S. PATENT DOCUMENTS

| | | | | | |
|---|---|---|---|---|---|
| 3,537,751 | A | * | 11/1970 | Inoue | B60N 2/7041 |
| | | | | | 297/216.14 |
| 3,695,707 | A | * | 10/1972 | Barecki | B60N 2/4221 |
| | | | | | 297/452.2 |
| 3,877,749 | A | * | 4/1975 | Sakurai | B60N 2/4256 |
| | | | | | 297/488 |
| 4,109,959 | A | | 8/1978 | Barecki et al. | |
| 4,252,341 | A | | 2/1981 | Barecki et al. | |

(Continued)

FOREIGN PATENT DOCUMENTS

| | | | | | |
|---|---|---|---|---|---|
| CN | 105416121 | A | * | 3/2016 | B60N 2/4249 |
| CN | 107804204 | A | | 3/2018 | |

(Continued)

*Primary Examiner* — Timothy J Brindley

(74) *Attorney, Agent, or Firm* — HAYNES AND BOONE, LLP

(57) ABSTRACT

A seat for a vehicle includes a frame. The frame includes a headrest portion. The seat for a vehicle also includes an energy absorption spacer coupled to the frame; a seat garnish positioned over the energy absorption spacer and the frame; and a seat trim cover. The seat trim cover has a first portion and a second portion. The first portion of the seat trim cover is coupled to the headrest portion, and the second portion of the seat trim cover extends between the energy absorption spacer and the seat garnish.

17 Claims, 13 Drawing Sheets

(56)  References Cited

U.S. PATENT DOCUMENTS

| | | | |
|---|---|---|---|
| 5,902,010 A * | 5/1999 | Cuevas ................ | B60N 2/4221 |
| | | | 297/DIG. 8 |
| 5,992,924 A | 11/1999 | Noritake et al. | |
| 6,126,231 A | 10/2000 | Suzuki et al. | |
| 6,328,333 B1 | 12/2001 | Patel et al. | |
| 7,934,587 B2 | 5/2011 | Thenier et al. | |
| 8,172,320 B2 | 5/2012 | Kalinowski | |
| 9,387,785 B2 * | 7/2016 | Bell ...................... | B60R 21/055 |
| 9,446,697 B2 * | 9/2016 | Akutsu ................ | B60N 2/5825 |
| 9,573,554 B2 * | 2/2017 | Nagasawa ............ | B60N 2/7094 |
| 9,656,582 B2 * | 5/2017 | Komatsubara ....... | B60N 2/4249 |
| 9,889,780 B2 * | 2/2018 | Tanabe ................. | B60N 2/4235 |
| 10,195,969 B2 * | 2/2019 | Veine ...................... | B60N 2/64 |
| 10,351,025 B2 | 7/2019 | Scherello et al. | |
| 11,535,129 B1 | 12/2022 | Suzuki et al. | |
| 2023/0039993 A1 | 2/2023 | Buhr et al. | |

FOREIGN PATENT DOCUMENTS

| | | | | | |
|---|---|---|---|---|---|
| CN | 111098765 A | * | 5/2020 | ............. | B60N 2/888 |
| CN | 119099448 A | * | 12/2024 | ............. | B60N 2/888 |
| CN | 119176067 A | * | 12/2024 | ........... | B60N 2/4249 |

* cited by examiner

HEAD IMPACT ENERGY ABSORPTION COMPONENT WITH INTEGRATED SEAT TRIM SUPPORT

TECHNICAL FIELD

The present disclosure generally relates to an energy absorption component and, more particularly, to a head impact energy absorption spacer component for a seat in a vehicle with integrated seat trim support.

BACKGROUND

Passenger safety is a key consideration in the manufacturing of vehicles. Seats are required to meet deceleration criteria to support regulatory compliance for head impact. For example, Federal Motor Vehicle Safety Standard (FMVSS) 201 applies to requirements for the use of energy-absorbing materials in interior components of a vehicle.

When a vehicle is in a head-on collision, passengers in the vehicle are propelled forward. As the passengers move forward, their heads may hit the seat in front of them. In such instances, seat belts or other conventional approaches may be insufficient to prevent (or reduce) injuries to the passengers.

SUMMARY

A first illustrative embodiment provides a seat for a vehicle having a front side and an opposing rear side. The rear side includes at least a portion of a headrest, a seat trim cover coupled to the portion of the headrest and an energy absorption spacer. The energy absorption spacer includes a trim guide and at least a portion of the seat trim cover follows the trim guide of the energy absorption spacer such that the portion of the seat trim cover is in contact with the energy absorption spacer.

A second illustrative embodiment provides a seat for a vehicle including a frame having a headrest portion, an energy absorption spacer coupled to the frame, a seat garnish positioned over the energy absorption spacer and the frame and a seat trim cover. The seat trim cover has a first portion and a second portion, wherein the first portion of the seat trim cover is coupled to the headrest portion. Further, the second portion of the seat trim cover extends between the energy absorption spacer and the seat garnish.

A third illustrative embodiment provides an energy absorption spacer feature that includes a first side and an opposing second side, and a plurality of through-holes extending from the first side to the second side. The first side includes a trim guide configured to support a seat trim cover such that the seat trim cover maintains its shape. Further, the second side includes a plurality of protrusions.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals, letters, or both in the various examples. This repetition is for the purpose of simplicity and clarity and does not in itself dictate a relationship between the various embodiments and/or configurations discussed.

DETAILED DESCRIPTION

Illustrative embodiments and related methods of the present disclosure are described below as they might be employed in one or more methods and systems for identifying an error related to a part received and determining a cause for the error. In the interest of clarity, not all features of an actual implementation or method are described in this specification. It will of course be appreciated that in the development of any such actual embodiment, numerous implementation specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various embodiments and related methods of the disclosure will become apparent from consideration of the following description and drawings.

The example embodiments described below recognize that it may be desirable to have methods and apparatuses that better protect the heads of passengers from impact of a front-collision.

One or more embodiments described below provide methods, systems, and apparatuses for aiding seat trim (seat trim covers) to follow a tight profile to meet styling, functionality, and customer expectations. For example, the seat trim cover may be combined with the energy absorption spacer to ensure performance and appearance. In some example embodiments, a trim guide of an energy absorption spacer positions the headrest trim between the seat garnish and the energy absorption spacer which provides shape to the headrest and allows the seat trim to follow the requisite tight profile. Therefore, in some embodiments, the energy absorption spacer serves as a guide or support for the seat trim to hold its shape.

Figure 1:
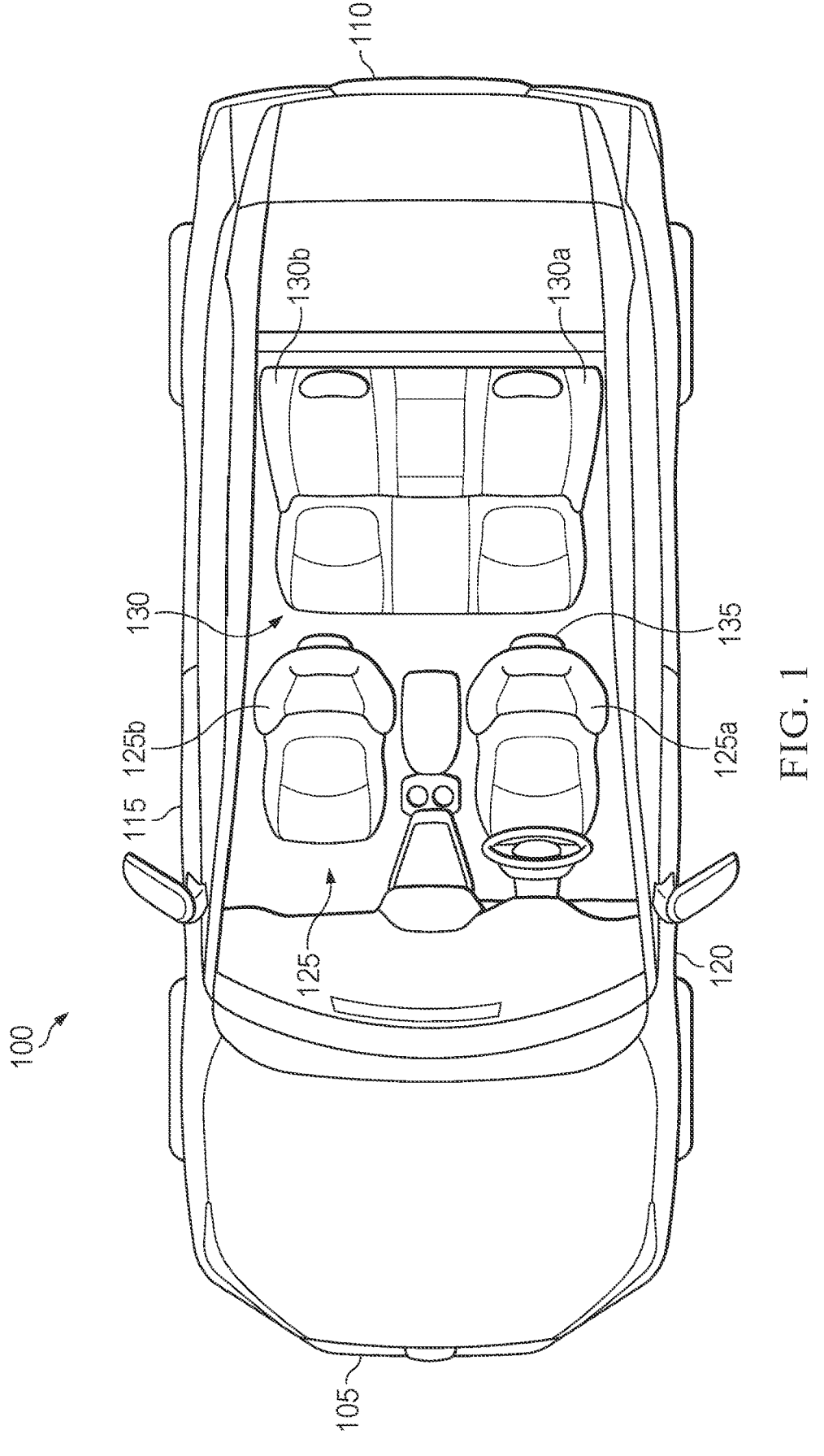
FIG. 1 is a cross-sectional view of a vehicle in accordance with one or more embodiments.

Referring to FIG. 1, in an embodiment, a vehicle is generally referred to by reference numeral 100. In one example embodiment, the vehicle 100 includes a front side 105, a rear side 110, a right side 115, and a left side 120, which together form the perimeter of the vehicle 100. The vehicle 100 includes a plurality of front row seats 125. The plurality of front row seats 125 include a driver seat 125a and a front row passenger seat 125b. The vehicle 100 includes a plurality of back row seats 130. The plurality of back row seats 130 include a first seat 130a positioned behind the driver seat 125a and a second seat 130b positioned behind the front row passenger seat 125b. The plurality of front row seats 125 include an energy absorption spacer 135 positioned on a rear side of the front row seats 125, as shown in FIG. 1 on the driver seat 125a and passenger seat 125b.

In one or more embodiments, the vehicle 100 is an automotive vehicle including but not limited to, an electric vehicle. In some embodiments, the vehicle 100 includes additional rows of seats positioned between the front row seats 125 and the back row seats 130. When there are additional rows of seats, these seats may also each include the energy absorption spacer 135 positioned on a rear side of the additional rows of seats. In several embodiments, the plurality of back row seats 130 also each include the energy absorption spacers 135 positioned on a rear side of the first seat 130a and the second seat 130b because an additional row of seats is positioned behind (closer to the rear side 110) the plurality of back row seats 130.

In one or more embodiments, the plurality of front row seats 125 includes two seats. In some embodiments, the plurality of front row seats 125 includes three seats. In some embodiments, the driver seat 125a is the same size, shape, and orientation (except for the seat belt clip location) as the front row passenger seat 125b. In some embodiments, the plurality of front row seats 125 is closer to the front side 105 than the rear side 110. In some embodiments, the driver seat 125a is located closer to the left side 120 than the right side 115. In other embodiments, the driver seat 125a is located closer to the right side 115 than the left side 120. In some embodiments, the front row passenger seat 125b is located closer to the left side 120 than the right side 115. In other embodiments, the front row passenger seat 125b is located closer to the right side 115 than the left side 120.

In one or more embodiments, the plurality of back row seats 130 includes one, two, or three seats. In some embodiments, the first seat 130a is the same size, shape, and orientation (except for the seat belt clip location) as the second seat 130b. In other embodiments, the first seat 130a is different in size, shape, and orientation from the second seat 130b. In some embodiments, the first seat 130a is adjacent to the second seat 130b. In several embodiments, the first seat 130a is in direct contact with and directly adjacent to the second seat 130b. In other embodiments, there is a third seat positioned between the first seat 130a and the second seat 130b. The third seat may be a different size, shape, or orientation. In some embodiments, the third seat may not have a front row seat of the plurality of front row seats 125 directly in front of them. In some embodiments, the first seat 130a is located closer to the right side 120 than the left side 115. In other embodiments, the first seat 130a is positioned closer to the left side 115 than the right side 120. In some embodiments, the second seat 130b is located closer to the right side 120 than the left side 115. In other embodiments, the second seat 130b is positioned closer to the left side 115 than the right side 120. In some embodiments, the plurality of back row seats 130 are closer to the rear side 110 than the front side 105.

In some embodiments, the energy absorption spacer 135 is positioned within each individual seat of the plurality of front row seats 125. In one or more embodiments, the energy absorption spacer 135 is referred to as an energy absorption spacer feature. In some embodiments, the energy absorption spacer 135 is positioned within each individual seat of the plurality of back row seats 130 when an additional row is positioned behind (closer to the rear side 110) the plurality of back row seats 130. In some embodiments, the energy absorption spacer 135 is a separate component.

Figure 2:
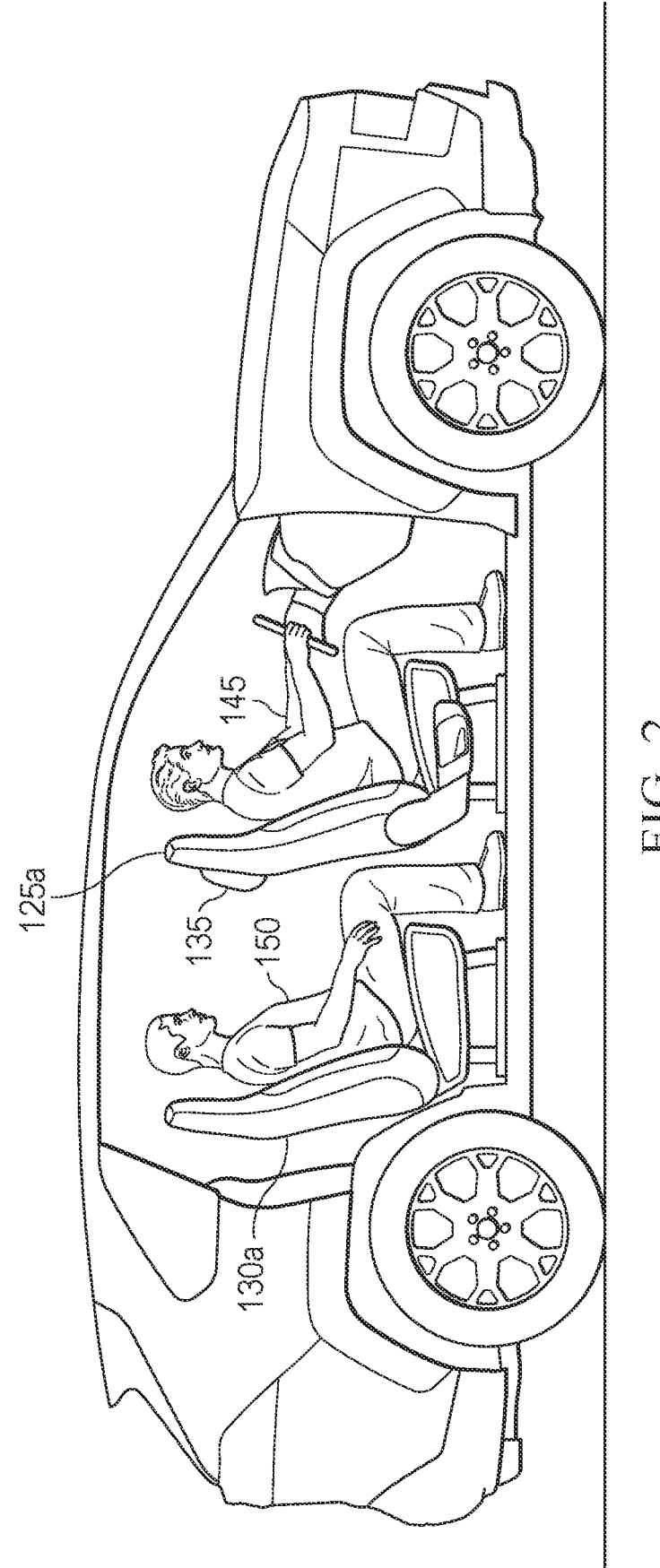
FIG. 2 is another cross-sectional view of the vehicle in accordance with one or more embodiments.

With reference to FIG. 2 and continuing reference to FIG. 1, a system including the vehicle 100 is shown and generally referred to by reference number 140, according to one or more embodiments. The vehicle 100 includes the driver seat 125a having the energy absorption spacer 135 positioned on a rear portion of the driver seat 125a and a driver 145 seating in a front portion of the driver seat 125a. The vehicle includes the first seat 130a and a passenger 150 seating in the first seat 130a. The first seat 130a is positioned behind the driver seat 125a. The driver 145 is positioned in front of the passenger 150 in the vehicle 100. The passenger 150 is facing the energy absorption spacer 135 of the driver seat 125a.

In some embodiments, the passenger 150 is positioned directly behind the driver seat 125a. In other embodiments, the passenger 150 is sitting in the second seat 130b and behind the front row passenger seat 125b. In several embodiments, the passenger 150 is facing the energy absorption spacer 135 of the front row passenger seat 125b. In some embodiments, there is a passenger such as passenger 150 positioned in each seat of the plurality of back row seats 130. In some embodiments, there is an additional passenger sitting in the front row passenger seat 125b. The number of passengers may vary in the vehicle 100 from one, two, three, four, or more.

In operation, the driver 145 sitting in the driver seat 125a drives the vehicle 100. The passenger 150 sits in the first seat 130a directly behind the driver seat 125a. The passenger 150 may be facing the energy absorption spacer 135 positioned on a rear portion of the driver seat 125a.

In some embodiments, the passenger 150 is instead behind the front row passenger seat 125b. In one or more embodiments, the passenger 150 is facing the energy absorption spacer positioned on a rear portion of the front row passenger seat 125b. In some embodiments, an additional passenger is sitting in the front row passenger seat 125b. In several embodiments, additional passengers are sitting within the vehicle 100. In other embodiments, no additional passengers are sitting in the vehicle 100.

FIG. 2 may illustrate, for example, the vehicle 100 of FIG. 1, a portion of the vehicle 100 of FIG. 1, and may include various components shown in FIG. 1.

Figure 3:
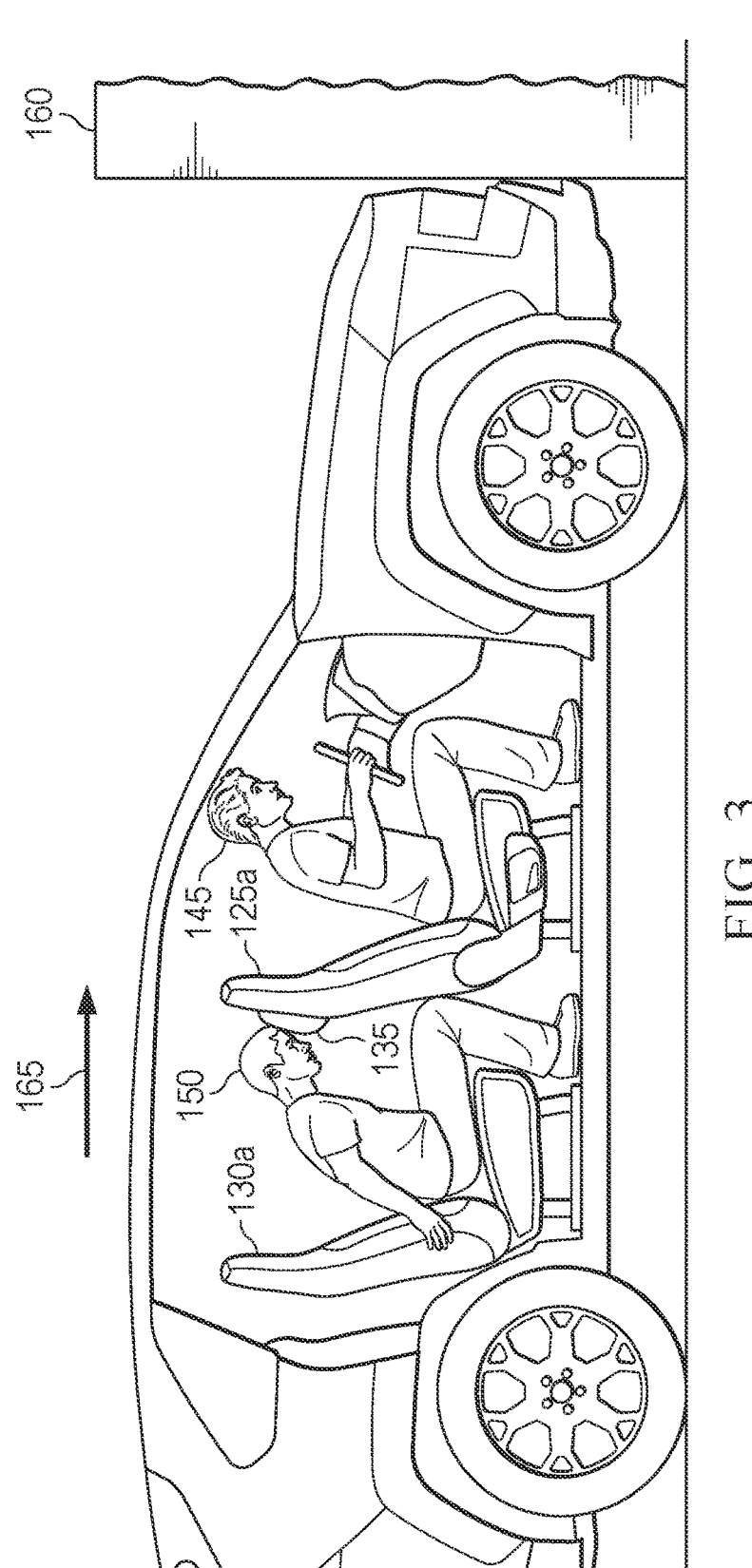
FIG. 3 is yet another cross-sectional view of the vehicle in accordance with one or more embodiments.

With reference to FIG. 3 and continuing reference to FIGS. 1 and 2, a system including the vehicle 100 is shown and generally referred to by reference number 155, according to one or more embodiments. The vehicle 100 includes the driver seat 125a having the energy absorption spacer 135 positioned on a rear portion of the driver seat 125a and a driver 145 contacting at least in part a front portion of the driver seat 125a. The vehicle includes the first seat 130a and a passenger 150 contacting at least a part the first seat 130a. The first seat 130a is positioned behind the driver seat 125a. The driver 145 is positioned in front of the passenger 150 in the vehicle 100. A head of the passenger 150 is in contact with the energy absorption spacer 135 of the driver seat 125a. The vehicle 100 is directly in contact with object 160. The arrow 165 depicts the movement of the vehicle 100 before colliding with the object 160.

In various embodiments, a head of the driver 145 is in direct contact with an airbag (not shown) and a seat belt buckle is holding in the driver 145 (not shown). In various embodiments, the driver 145 is positioned in at least part above the driver seat 125a. In some embodiments, legs of the driver 145 are in contact with the driver seat 125a. In some embodiments, legs of the driver 145 are the only body parts of the driver 145 in contact with the driver seat 125a.

In several embodiments, a head of the passenger 150 is in direct contact with the energy absorption spacer 135 of the driver seat 125a. In one or more embodiments, a seat belt buckle is holding in the passenger 150 (not shown). In various embodiments, the passenger 150 is positioned above the first seat 130a. In some embodiments, legs of the passenger 150 are in contact with the first seat 130a. In some embodiments, legs of the passenger 150 are the only body parts of the passenger 150 in contact with the first seat 130a. In several embodiments, the passenger 150 is sitting in the second seat 130b and behind the front row passenger seat 125b. In several embodiments, the passenger 150 is in contact with the energy absorption spacer 135 of the front row passenger seat 125b. In several embodiments, a head of the passenger 150 is in direct contact with the portion of the driver seat 125a containing the energy absorption spacer 135 of the front row passenger seat 125b. In some embodiments, there is a passenger such as passenger 150 positioned in each seat of the plurality of back row seats 130. In some embodiments, there is an additional passenger sitting in the front row passenger seat 125b. The number of passengers may vary in the vehicle 100 from one, two, three, four, or more.

In some embodiments, the object 160 is another vehicle. In other embodiments, the object 160 is any object that slows or stops the forward motion 165 of the vehicle 100 such as, but not limited to, a building, a pole, a gate, and the like. In some embodiments, the object 160 is stationary. In other embodiments, the object 160 is moving. In some embodiments, the object 160 is moving in an opposite direction as the vehicle 100.

In some embodiments, the arrow 165 represents the velocity of the vehicle 100. In some embodiments, the arrow 165 represents the forward motion of the vehicle 100 prior to contacting the object 160.

In operation, the driver 145 sitting in the driver seat 125a drives the vehicle 100. The passenger 150 sits in the first seat 130a directly behind the driver seat 125a. The passenger 150 may be facing the energy absorption spacer 135 positioned on a rear portion of the driver seat 125a, as described in FIG. 2. The driver 145 is driving the vehicle 100 in a forward motion represented by arrow 165 until the driver 145 collides the vehicle 100 into the object 160. Hitting the object 160 causes the driver 145 and the passenger 150 to continue moving forward. The head of the passenger 150 contacts driver seat 125a containing the energy absorption spacer 135. The head of the driver 145 may hit an airbag (not shown).

In some embodiments, the passenger 150 is instead behind the front row passenger seat 125b. In one or more embodiments, the passenger 150 is contacting the rear side of the front row passenger seat 125b. In some embodiments, the passenger 150 contacts the portion of the front row passenger seat 125b having the energy absorption spacer 135. In several embodiments, additional passengers are sitting within the vehicle 100. In other embodiments, no additional passengers are sitting in the vehicle 100.

FIG. 3 may illustrate, for example, the vehicle 100 of FIG. 1, the system 140, a portion of the system 140 of FIG. 2, and may include various components shown in FIGS. 1-2.

Figure 4:
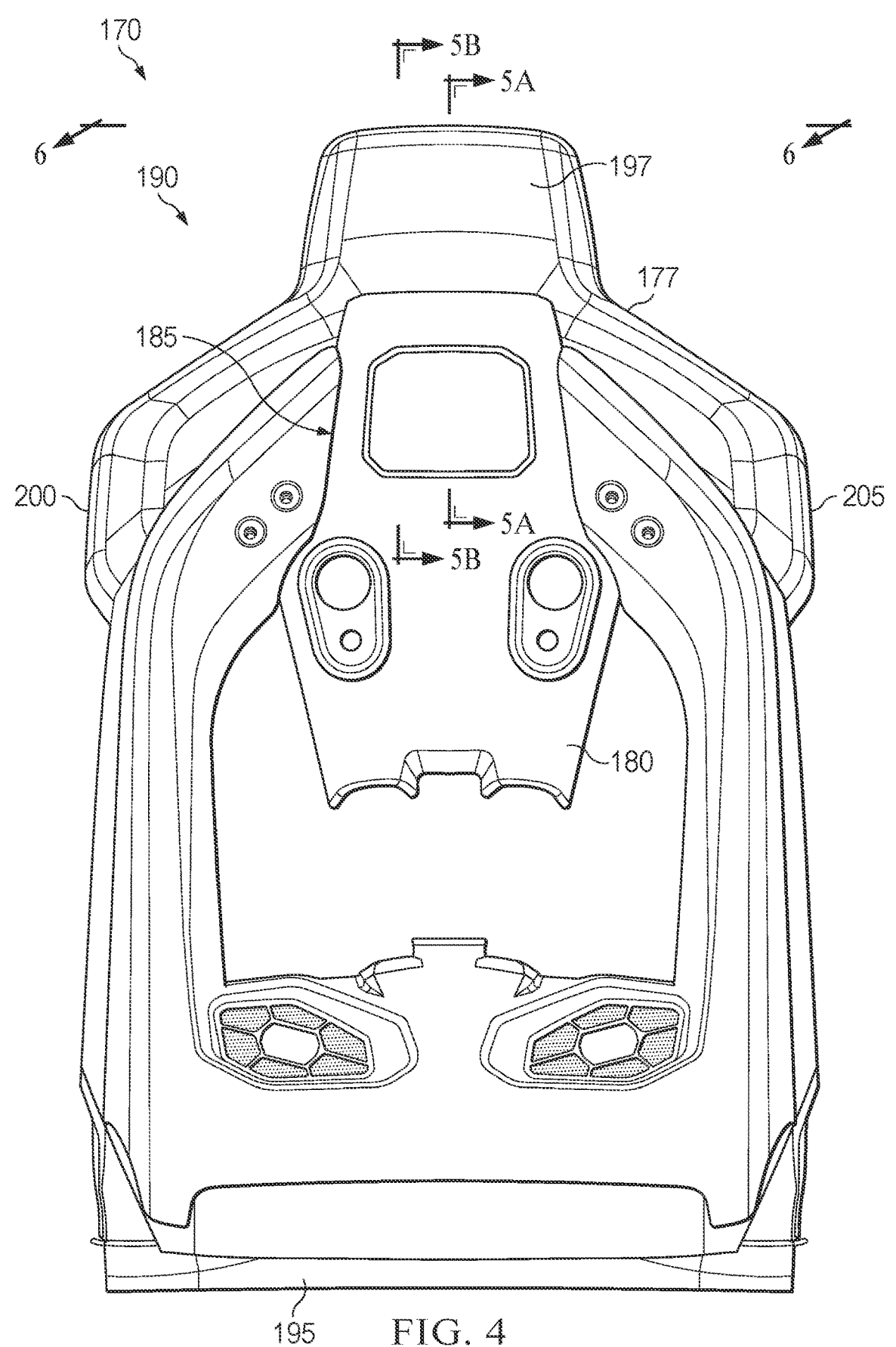
FIG. 4 is a rear view of a front row seat of a vehicle in accordance with one or more embodiments

With reference to FIG. 4, a rear view of a front row seat is generally referred to by reference number 170. The front row seat 170 includes a frame 175, seat surface 177, a seat garnish 180, and an energy absorption spacer 185 (spacer 185 is hidden behind garnish 180). The front row seat 170 includes a top portion 190 and an opposing, bottom portion 195. The top portion 190 of the front row seat 170 includes a headrest 197, a first extended portion 200, and a second extended portion 205. The headrest 197 is positioned between the first extended portion 200 and the second extended portion 205.

In some embodiments, the frame 175 extends and forms a portion of the headrest 197, the first extended portion 200, and the second extended portion 205. In some embodiments, the frame 175 extends from the top portion 190 to the bottom portion 195. The frame 175, in some embodiments, is comprised of a metal such as steel or the like. In some embodiments, portion of the frame 175 is hollow or has a plurality of openings.

In one or more embodiments, the seat garnish 180 covers the majority (50% or more) of the frame 175. In some embodiments, the seat garnish 180 covers the entirety of the frame 175. In one or more embodiments, the seat garnish 180 covers the energy absorption spacer 185 in at least the rear view of the front row seat 170. The seat garnish 180 may be a fabric, cloth, leather, or other typical automobile seat covering. In some instances, the seat garnish 180 includes at least a plastic portion.

In some embodiments, the energy absorption spacer 185 is coupled to the frame 175. The energy absorption spacer 185 is comprised of plastic, metal, foam, or the like. In some instances, the energy absorption spacer 185 is a separate and distinct component coupled to the frame 175. In some embodiments, the energy absorption spacer 185 includes a plurality of through-holes or through-openings that provide a place to thread one or more bolts in order to attach the energy absorption spacer 185 to the frame 175. In some embodiments, an additional opening is placed in the energy absorption spacer 185 to fasten the frame 175 having an extended portion sized to fit the additional opening. In one or more embodiments, a top portion of the energy absorption spacer 185 acts as a trim guide for a seat trim cover.

The top portion 190 and the bottom portion 195 in some embodiments are a non-uniform shape. In some embodiments, a length extends between the top portion 190 and the bottom portion 195.

In several embodiments, the energy absorption spacer 185 is coupled to and/or operably attached to a portion of the headrest 197. In one or more embodiments, the headrest 197 is narrower in shape than the first extended portion 200 and the second extended portion 205. The first extended portion 200, in some embodiments, mirrors the second extended portion 205. In some embodiments, the energy absorption spacer 185 is positioned between the first extended portion 200 and the second extended portion 205. In some embodiments, the energy absorption spacer 185 extends between the headrest 197 and the bottom portion 195. In one or more embodiments, the energy absorption spacer 185 is beneath the headrest 197, and therefore is located closer to the bottom portion 195 than the headrest 197 is located to the bottom portion 195. In one or more embodiments, the energy absorption spacer 185 is equidistant from the first extended portion and the second extended portion 205.

FIG. 4 may illustrate, for example, portions of the vehicle 100 of FIG. 1, the system 140 of FIG. 2, the system 155 of FIG. 3, and may include various components shown in FIGS. 1-3 such as the driver seat 125a, the front row passenger seat 125b, and the energy absorption spacer 135. For example, in some embodiments, the energy absorption spacer 185 is the energy absorption spacer 135 of FIGS. 1-3.

Figure 5A:
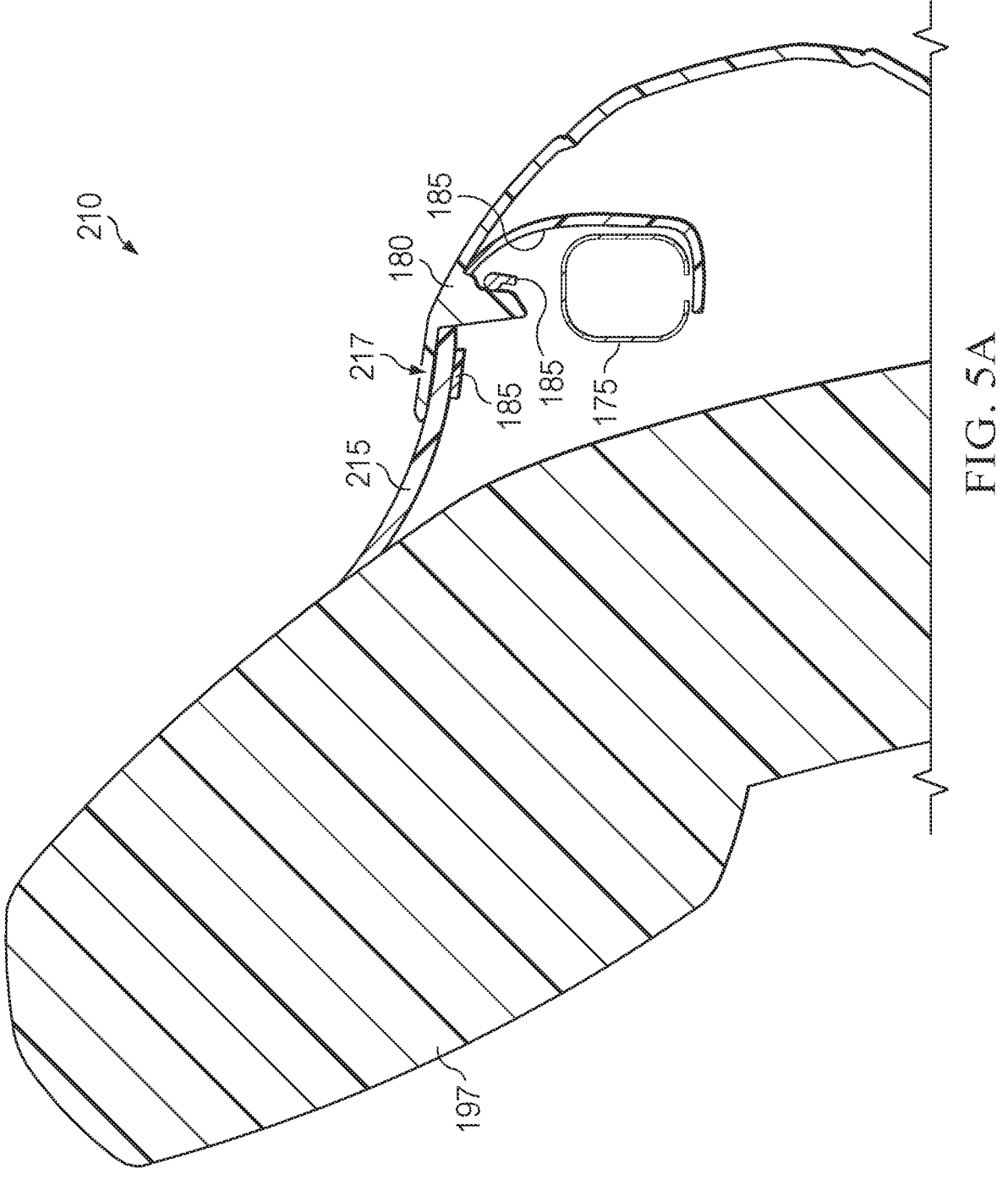
FIG. 5A is a cross-sectional side view of a portion of the front row seat of FIG. 4 in accordance with one or more embodiments.

With reference to FIG. 5A, a cross-sectional view of the front row seat 170 along the 5A-5A line is generally referred to by reference number 210. The front row seat 170 includes the seat belt (not shown), frame 175, the seat garnish 180, the energy absorption spacer 185, and the seat trim cover 215. The seat trim cover 215 include a rear portion of the fixed headrest trim 217 routed over the energy absorption spacer 185 to form the shape of the seat trim cover 215. The seat trim cover 215 is coupled to the headrest 197. The seat trim cover 215, in particularly the rear portion of the fixed headrest trim 217, is positioned between a portion of the energy absorption spacer 185 and a portion of the seat garnish 180.

Figure 5B:
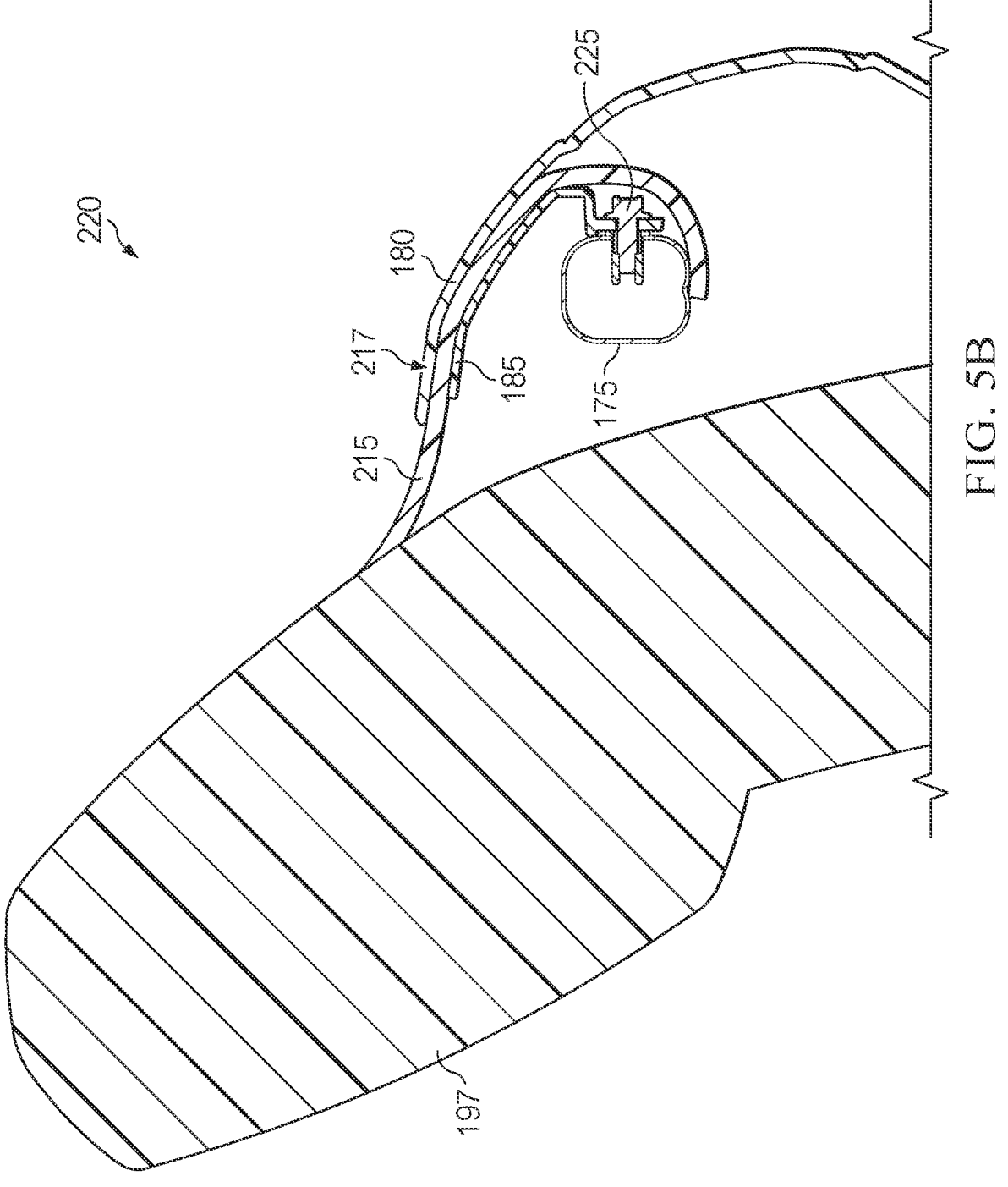
FIG. 5B is another cross-sectional side view of a portion of the front row seat of FIG. 4 in accordance with one or more embodiments.

With reference to FIG. 5B, a cross-sectional view of the front row seat 170 along the 5B-5B line is generally referred to by reference number 215. The front row seat 170 includes the frame 175, the seat garnish 180, the energy absorption spacer 185, and the seat trim cover 215. The energy absorption spacer 185 is coupled to the frame 175 via one or more bolts 225. The seat trim cover 215 include a rear portion of the fixed headrest trim 217 routed over the energy absorption spacer 185 to form the shape of the seat trim cover 215. The seat trim cover 215 is coupled to the headrest 197. The seat trim cover 215 is positioned directly between the energy absorption spacer 185 and the seat garnish 180.

With continuing reference to FIGS. 5A and 5B, in some embodiments, the seat surface 215 extends and forms a portion of the headrest 197. In other embodiments, a separate frame is used to form the headrest 197. In some embodiments, the headrest 197 is coupled to the frame 175. In some embodiments, the energy absorption spacer 185 is coupled to the frame 175 using a different fastening means than the one or more bolts 225, such as screws, clips, and the like.

In one or more embodiments, the seat garnish 180 is fastened over the energy absorption spacer 185 in order to sandwich the seat trim cover 215 in between the seat garnish 180 and the energy absorption spacer 185. The seat garnish 180 may be fastened to the seat trim cover 215, the frame 175, and/or the energy absorption spacer 185 using an adhesive, via sewing, via staples, or the like.

In one or more embodiments, the portion of the energy absorption spacer 185 contacting the seat trim cover 215 is a trim guide. In one or more embodiments, the contact by the seat trim cover is a direct contact with the trim guide of the energy absorption spacer 185. In several embodiments, the trim guide is the top portion of the energy absorptions spacer 185. In one or more embodiments, the top portion of the energy absorption spacer may include indentations which help to grip the rear portion of the fixed headrest trim 217. In some embodiments, the top portion of the energy absorption spacer may include adhesive to help grip the rear portion of the fixed headrest trim 217. In one or more embodiments, the rear portion of the fixed headrest trim 217 follows a route of the trim guide. In some embodiments, the energy absorption spacer 185 is coupled to the frame 175 via bolts, screws, or the like. In some embodiments, the seat trim cover 215 is coupled to the energy absorption spacer 185 using adhesive, sewing, staples, or the like. In other embodiments, the seat trim cover 215 is coupled to the energy absorption spacer due to adhesive, stapes, sewing, or the like of the seat garnish 180.

In various embodiments, the seat trim cover 215 is coupled to the frame 175, the seat garnish 180, and/or the energy absorption spacer 185 using adhesive, sewing, staples, or the like. In one or more embodiments, the seat trim cover 215 is comprised of a cloth, fabric such as leather, or the like. In some embodiments, the seat trim cover 215 is comprised of a different material than the seat garnish 180. In other embodiments, the seat trim cover 215 is comprised of a same material as the seat garnish 180. In several embodiments, the seat trim cover 215 is coupled to the headrest 197. In some embodiments, the seat trim cover 215 extends away from the headrest 197 and toward the bottom portion 195. In one or more embodiments, a portion of the seat trim cover 215 such as the rear portion of the fixed headrest trim 217 extends away from the headrest 197 in between the seat garnish 180 and the energy absorption spacer 185 to wrap around a portion of the frame 175. In some embodiments, the energy absorption spacer 185 creates a route for the seat trim cover 215. In one or more embodiments, the energy absorption spacer 185 (such as the trim guide described herein) creates a route for the seat trim cover 215 to extend and creates a tight profile for the front row seat 170. For example, by placing the rear portion of the fixed headrest trim 217 within the space between the energy absorption spacer 185 and the seat garnish 180, a smooth transition is created, since the seat trim cover 215 does not have an abrupt end visible on the rear view of the front row seat 170. Additionally, by placing the rear portion of the fixed headrest trim 217 within the space between the energy absorption spacer 185 and the seat garnish 180, allows the seat trim cover 215 to hold its shape because the energy absorption spacer 185 serves as a guide. In some embodiments, the seat trim cover 215 includes a first end and a second end. In one or more embodiments, the first end is coupled to the headrest 197. In some embodiments, the second end is coupled to the frame 175. In one or more embodiments, the seat trim cover 215 and in particular, the rear portion of the fixed headrest trim and the second end, follow the outer edge and/or trim guide of the energy absorption spacer 185 and is wrapped around the energy absorption spacer 185 to contact the frame 175.

In one or more embodiments, the one or more bolts 225 are only a single bolt. In other embodiments, the one or more bolts 225 are a plurality of bolts such as two bolts. In some embodiments, the one or more bolts 225 includes a nut and a washer. In one or more embodiments, the one or more bolts 225 is replaced with another fastening means such as a clip, screw, or the like. In some embodiments, the rear portion of the fixed headrest trim 217 extends around the portion of the energy absorption spacer that is bolted in via the one or more bolts 225 to the frame 175.

As shown in the cross-sectional view of FIG. 5B, in some embodiments, a portion of the seat garnish 180 is an outermost layer of the front row seat 170. In some embodiments, the rear portion of the fixed headrest trim 217 is positioned radially inward from the portion of the seat garnish 180. In one or more embodiments, the energy absorption spacer 185 is positioned radially inward from a portion of the rear portion of the fixed headrest trim 217. For example, in some embodiments, an end of the seat trim cover 215 is coupled to the frame 175 and is radially inward from the energy absorption spacer 185. In one or more embodiments, the frame 175 is positioned radially inward from the energy absorption spacer 185.

FIGS. 5A-5B may illustrate, for example, portions of the vehicle 100 of FIG. 1, the system 140 of FIG. 2, the system 155 of FIG. 3, portions of the front row seat 170 of FIG. 4 and may include various components shown in FIGS. 1-4 such as the driver seat 125a, the front row passenger seat 125b, and the energy absorption spacer 135. For example, in some embodiments, the energy absorption spacer 185 is the energy absorption spacer 135 of FIGS. 1-3.

Figure 6:
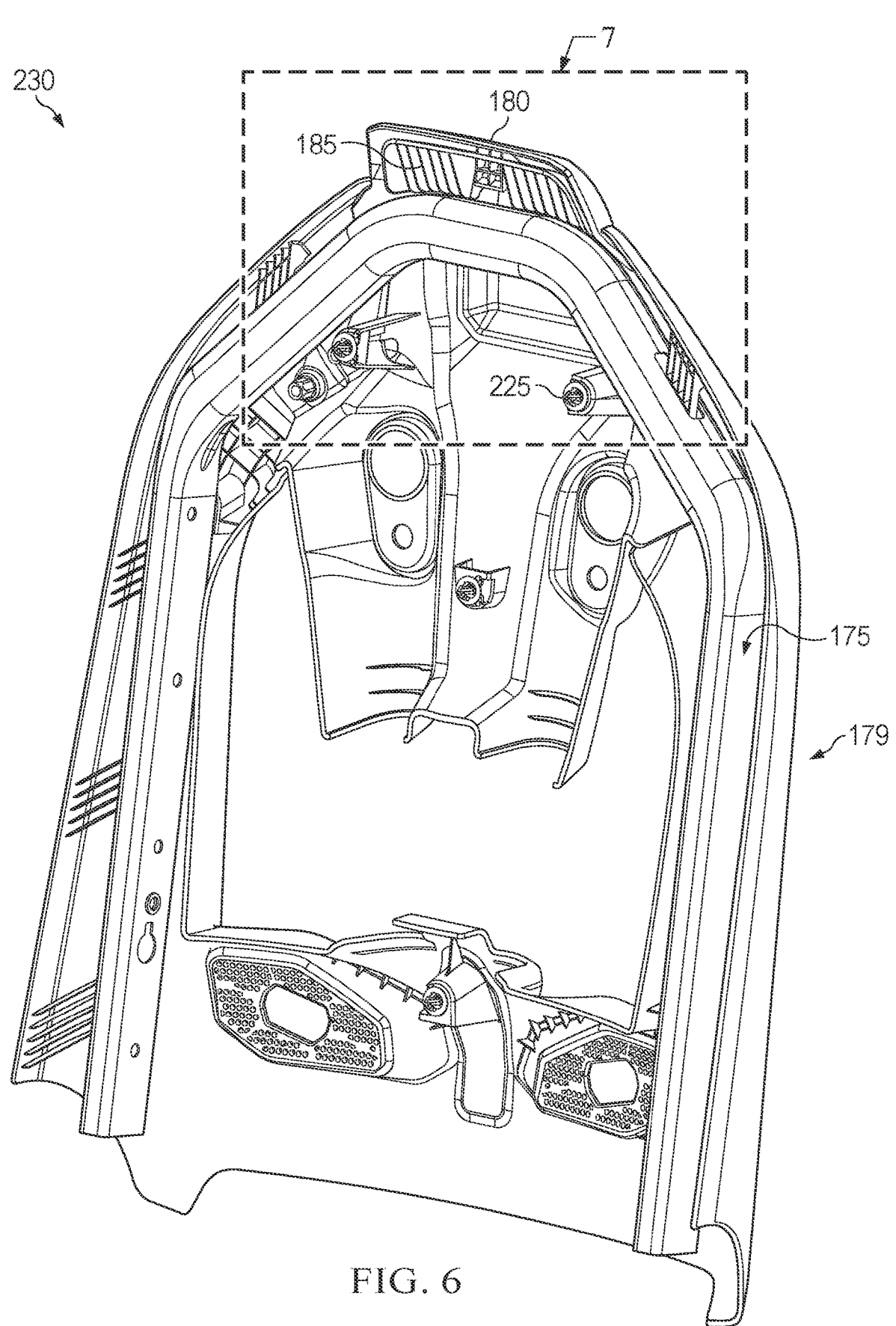
FIG. 6 is an isometric view of a portion of the front row seat of FIG. 4 in accordance with one or more embodiments.
Figure 7:
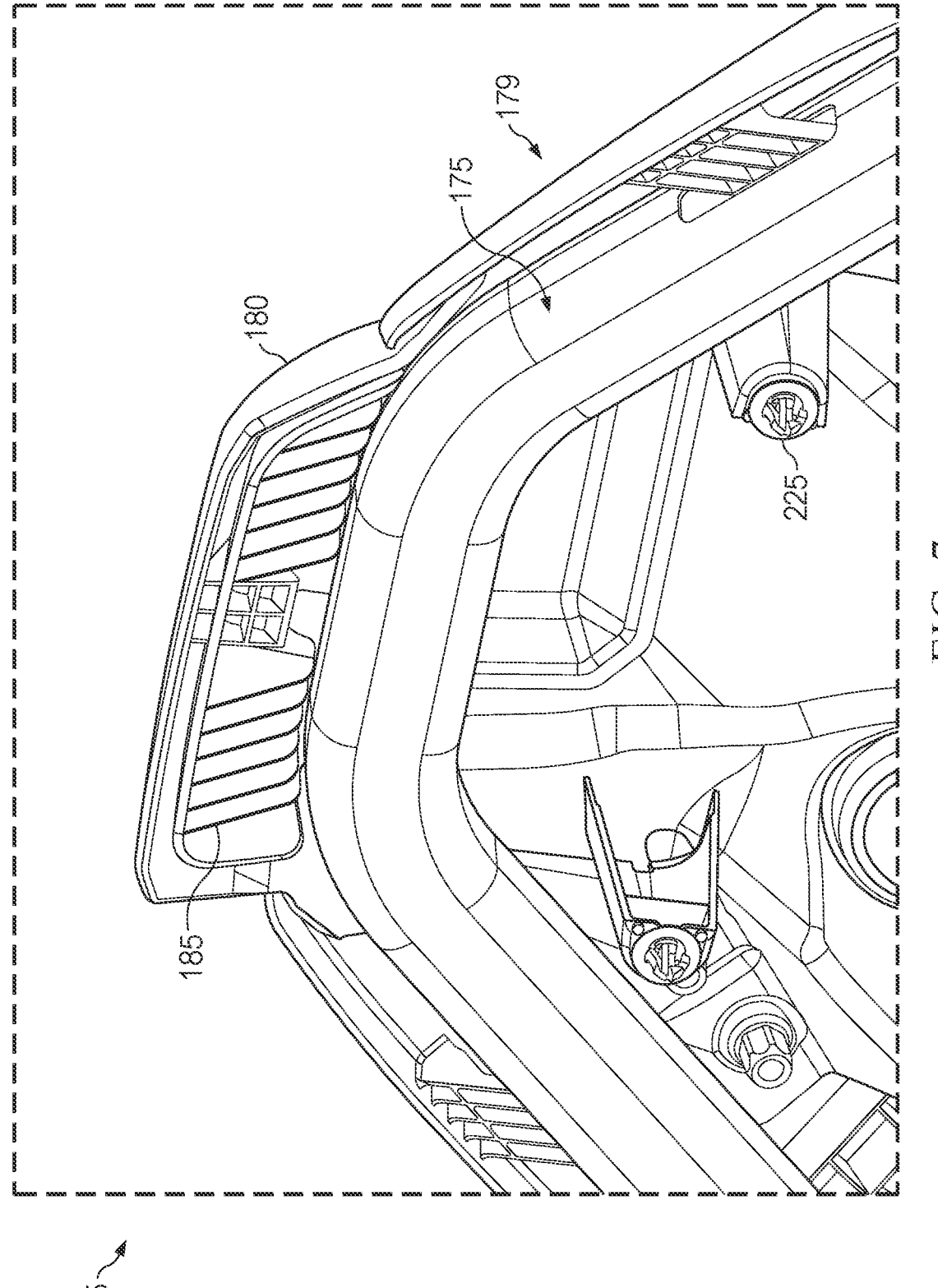
FIG. 7 is an expanded view of a portion of FIG. 6 in accordance with one or more embodiments.

With reference to FIG. 6, an isometric view of the front row seat 170 along the 6-6 line, depicting a front view of an interior portion of the front row seat 170 is generally referred to by reference number 230. With reference to FIG. 7, an expanded view of the interior portion 230 of the front row seat 170 is generally referred to by reference number 235. With continuing reference to FIGS. 6 and 7, the front row seat 170 includes the frame 175, outer garnish 179, the seat garnish 180, the energy absorption spacer 185, and the one or more bolts 225. The energy absorption spacer 185 is coupled to the frame 175 via one or more bolts 225. The seat garnish 180 surrounds at least a portion of the energy absorption spacer 185.

In some embodiments, the one or more bolts 225 couple a different component to the frame 175. In some embodiments, as shown in FIG. 7, two bolts of the one or more bolts 225 couple the frame 175 and the energy absorption spacer 185.

In one or more embodiments, at least a portion of the energy absorption spacer 185 directly contacts the frame 175. For example, the portion of the energy absorption spacer 185 coupled via the one or more bolts 225 to the frame 175. In some embodiments, the seat garnish 180 covers at least three sides of the energy absorption spacer 185. In one or more embodiments, the seat garnish covers at least five sides of the energy absorption spacer 185. In some embodiments, the seat trim cover 215 is positioned between a top portion (trim guide) of the energy absorption spacer 185 and a bottom portion of a seat garnish 180.

FIGS. 6-7 may illustrate, for example, portions of the vehicle 100 of FIG. 1, the system 140 of FIG. 2, the system 155 of FIG. 3, portions of the front row seat 170 of FIG. 4 and may include various components shown in FIGS. 1-5B such as the driver seat 125a, the front row passenger seat 125b, and the energy absorption spacer 135. For example, in some embodiments, the energy absorption spacer 185 is the energy absorption spacer 135 of FIGS. 1-3.

Figure 8:
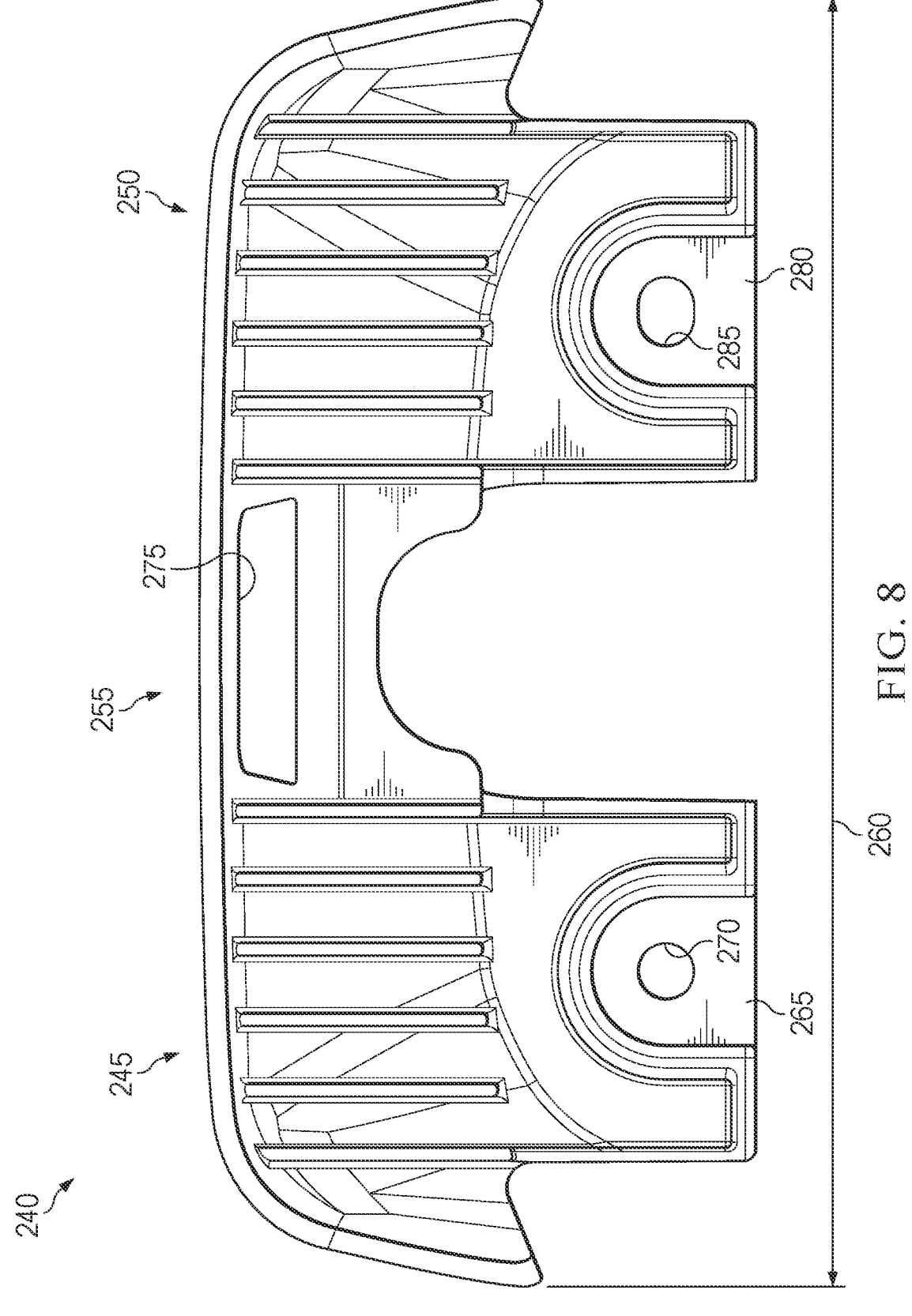
FIG. 8 is an illustration of a front view of an energy absorption spacer in accordance with one or more embodiments.

With reference to FIG. 8, a front view of the energy absorption spacer 185 is generally referred to by reference number 240. The energy absorption spacer 240 includes a first portion 245 and a second portion 250 that is opposite to the first portion 245. A third portion 255 is positioned between the first portion 245 and the second portion 250.

The first portion 245, the second portion 250, and the third portion 255 are distributed along a length 260. The first portion 245 includes a first recessed portion 265 having a first through-hole 270. The second portion 250 includes a second recessed portion 280 having a second through-hole 285. The third portion 255 includes a third through-hole 275.

Figure 9:
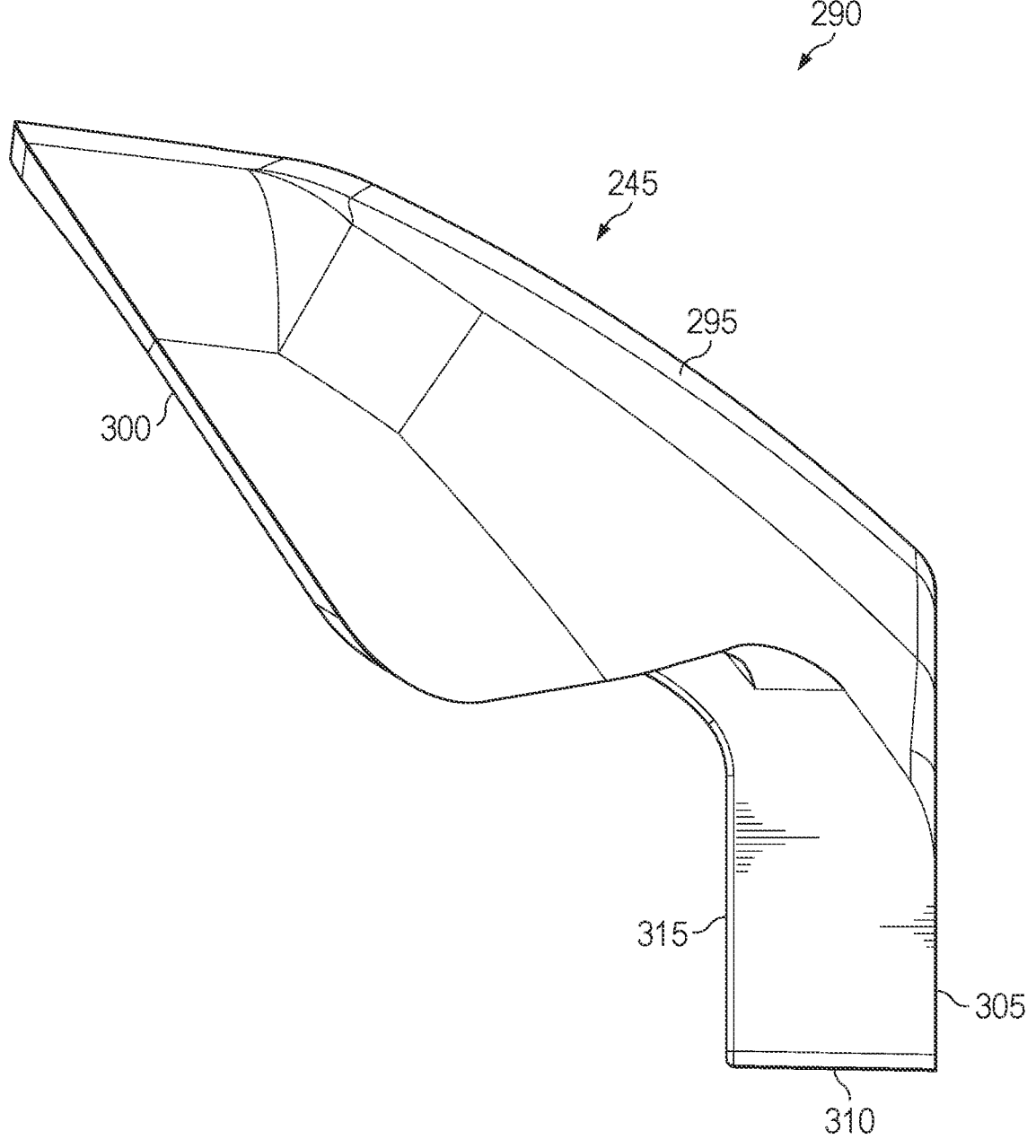
FIG. 9 is an illustration of a right-side view of the energy absorption spacer of FIG. 8 in accordance with one or more embodiments.

With reference to FIG. 9, a right-side view of the energy absorption spacer 185 is generally referred to by reference number 290. The right-side view depicts the first portion 245. The first portion 245 includes a first upper edge 295 and a second upper edge 300 contact the first upper edge 295. The first portion 245 includes a first bottom edge 305, a second bottom edge 310, and a third bottom edge 315. The first bottom edge 305 is parallel to the third bottom edge 315. The second bottom edge 310 is perpendicular to the first bottom edge 305 and the third bottom edge 315. The second bottom edge 310 is directly contacting the first bottom edge 305 and the third bottom edge 315. In some embodiments, the left-side view (not shown) is a mirror image to the right-side view 290.

Figure 10:
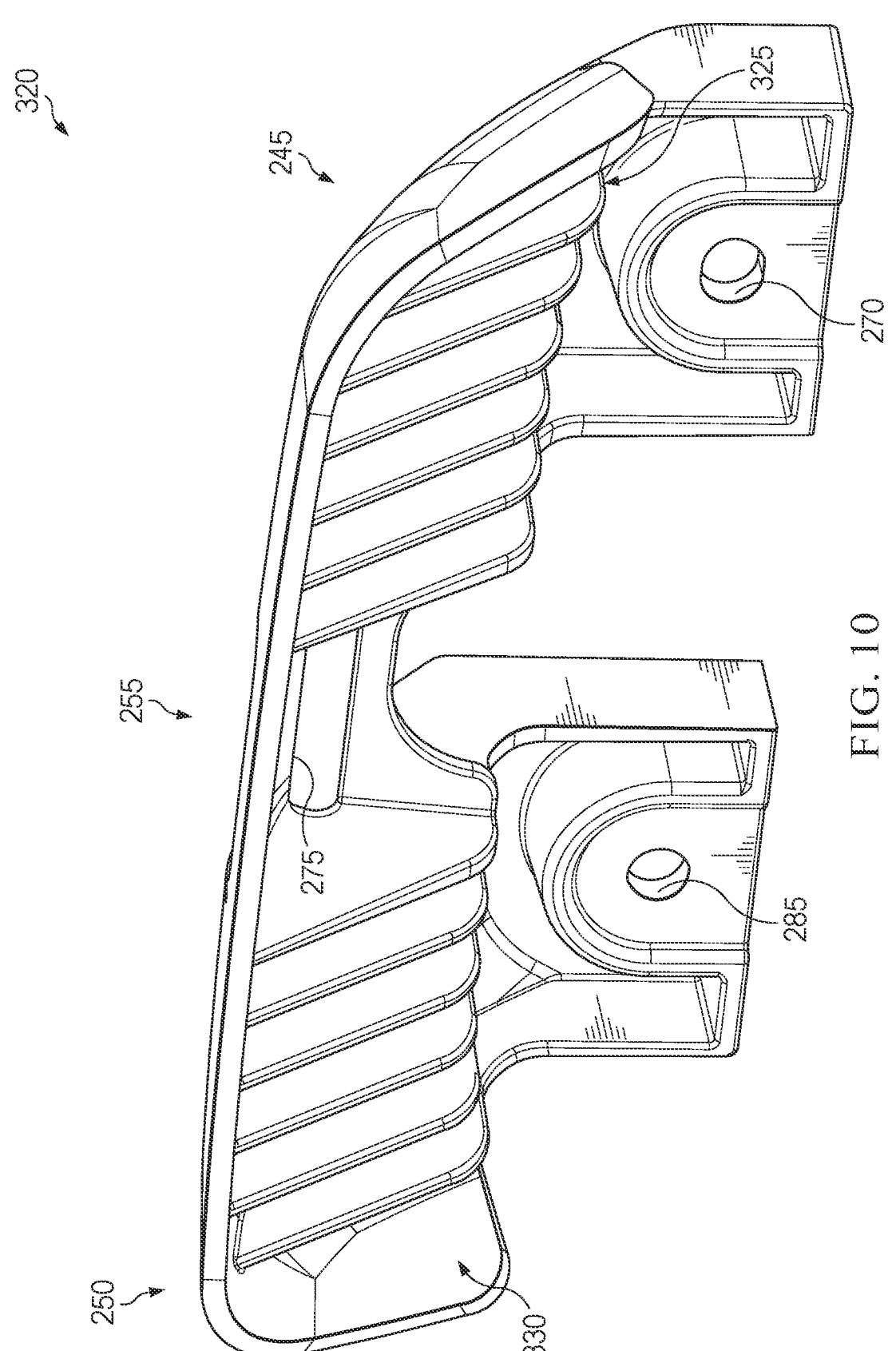
FIG. 10 is an illustration of a front-isometric view of the energy absorption spacer of FIG. 8 in accordance with one or more embodiments.

With reference to FIG. 10, an isometric view of the energy absorption spacer 185 is generally referred to by reference number 320. The energy absorption spacer 185 includes the first portion 245, the second portion 250 that is opposite to the first portion 245, and the third portion 255 positioned between the first portion 245 and the second portion 250. The first portion 245 includes a first plurality of protrusions 325, and the second portion 250 includes a second plurality of protrusions 330. The first portion 245 includes the first through-hole 270. The second portion 250 includes the second through-hole 285. The third portion 255 includes the third through-hole 275. The first upper edge 295 defines an outer slope of the energy absorption spacer 185. The first plurality of protrusions 325 are adjacent to the second plurality of protrusions 330. The first plurality of protrusions 325 and the second plurality of protrusions 330 are adjacent to the third through-hole 275. The first plurality of protrusions 325 are positioned above the first through-hole 270, and the second plurality of protrusions 330 are positioned above the second through-hole 285.

Figure 11:
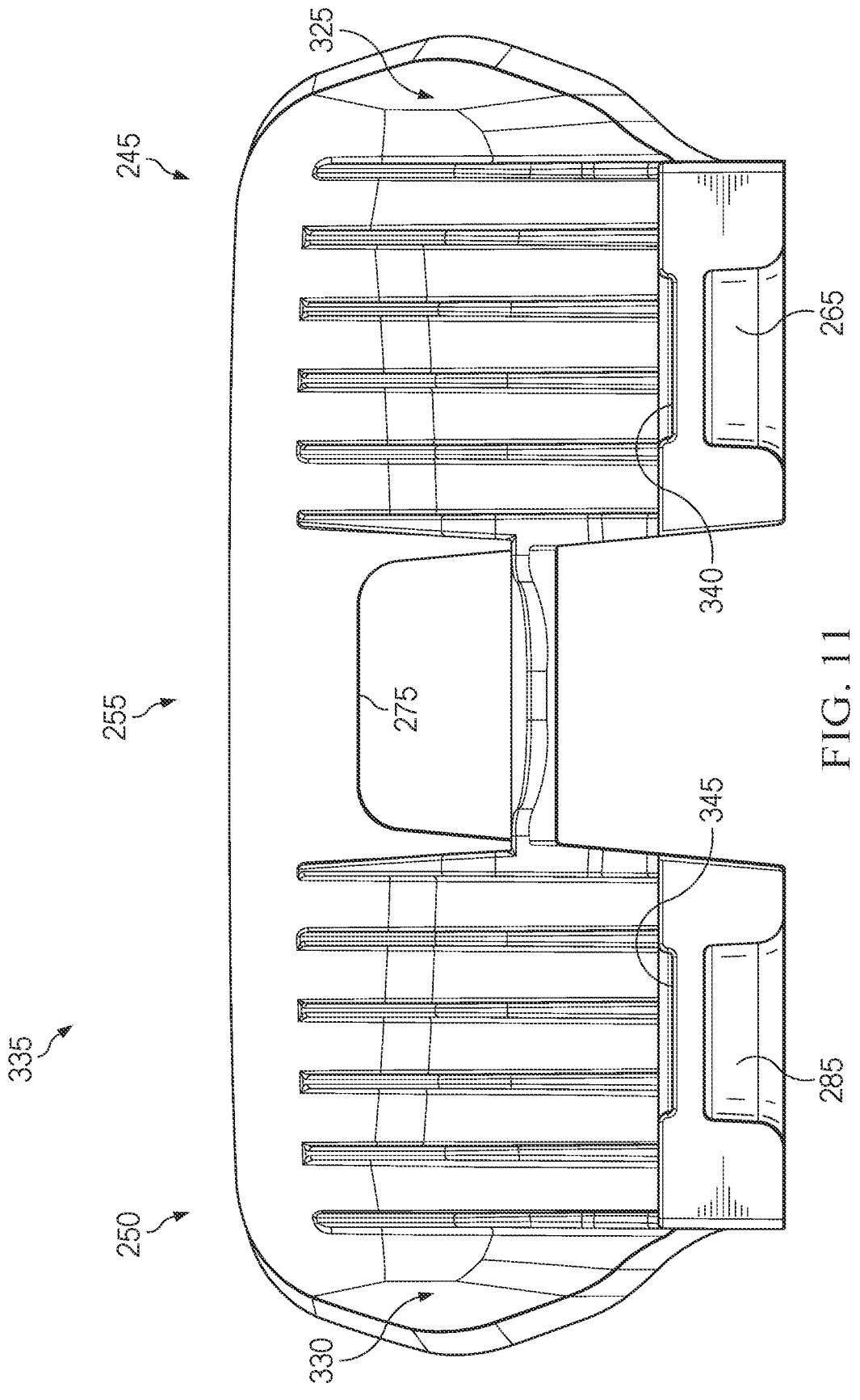
FIG. 11 is an illustration of a bottom view of the energy absorption spacer of FIG. 8 in accordance with one or more embodiments.

With reference to FIG. 11, a bottom view of the energy absorption spacer 185 is generally referred to by reference number 335. The energy absorption spacer 185 includes the first portion 245, the second portion 250 that is opposite to the first portion 245, and the third portion 255 positioned between the first portion 245 and the second portion 250. The first portion 245 includes a first plurality of protrusions 325, and the second portion 250 includes a second plurality of protrusions 330. The third portion 255 includes the third through-hole 275. The first portion 245 includes the first recessed portion 265 and a third recess portion 340. The third recess portion 340 is opposite the first recessed portion 265. The first through-hole 270 (shown in FIG. 10) extends from the first recessed portion 265 to the third recessed portion 340. The second portion 250 includes the second recessed portion 280 and a fourth recess portion 345. The fourth recess portion 345 is opposite the second recessed portion 280. The second through-hole 285 (shown in FIG. 10) extends from the second recessed portion 280 to the third recessed portion 340.

With continuing reference to FIGS. 8-11, in some embodiments, the first portion 245 mirrors the second portion 250. In some embodiments, the first portion 245 is the same size as the second portion 250. In various embodiments, the first portion 245 extends a same amount of the length 260 as the second portion 250. In one or more embodiments, the first portion 245 and the second portion 250 extend along a greater amount of the length 260 than the third portion 255. In other embodiments, the third portion 250 extends along a greater portion of the length 260 than the first portion 245 and the second portion 250. In some embodiments, the first portion 245 and the second portion 250 each have a plurality of indentations on a first side of the energy absorption spacer 185 corresponding to the first plurality of protrusions 325 and the second plurality of protrusions 330 positioned on the second side. The first side of the energy absorption spacer 185 may be depicted in a front view (such as FIG. 8). The second side of the energy absorption spacer 185 may be a rear view (such as FIG. 10 which is an isometric rear view). The rear view may be positioned directly on a frame of a rear portion of a seat such as front row seat 170. In some embodiments, the first portion 245 and the second portion 250 form the trim guide such that the slope of the first portion 245 and the second portion 250 guides the seat trim cover (such as the seat trim cover 215) along the energy absorption spacer 185. In one or more embodiments, the first portion 245 and the second portion 250 form the trim guide such that the indentations from the first plurality of protrusions 325 of the first portion 245 and the second plurality of protrusions 330 of the second portion 250 guide and grip the seat trim cover (such as the seat trim cover 215) along the energy absorption spacer 185. In one or more embodiments, the first portion 245 and the second portion 250 form the trim guide such that the seat trim cover is extended along the first portion 245 and/or the second portion 250 and coupled to the frame such as the frame 175.

In some embodiments, the first recessed portion 265 is shaped like a semi-circle. In several embodiments, the first recessed portion 265 includes one or more sloped edges. In other embodiments, the first recessed portion 265 is shaped as an oval, polygon, or the like. In yet other embodiments, the first recessed portion 265 is not recessed and is level with the remainder of the energy absorption spacer 185. In some embodiments, the first recessed portion 265 is identical in size, shape, and/or orientation to the second recessed portion 280. In one or more embodiments, the first recessed portion 265 mirrors the second recessed portion 280. In some embodiments, the first recessed portion 265 is recessed so that a top cap of a bolt such as the one or more bolts 225 may fit entirely within the first recessed portion 265 when threaded through the first through-hole 270. In some embodiments, the first recessed portion 265 is recessed so that a portion of a top cap of a bolt may fit within the first recessed portion 265.

In various embodiments, the second recessed portion 280 is shaped like a semi-circle. In several embodiments, the second recessed portion 280 includes one or more sloped edges. In other embodiments, the second recessed portion 280 is shaped as an oval, polygon, or the like. In yet other embodiments, the second recessed portion 280 is not recessed and is level with the remainder of the energy absorption spacer 185. In some embodiments, the second recessed portion 280 is recessed so that a top cap of a bolt such as the one or more bolts 225 may fit entirely within the second recessed portion 280 when threaded through the second through-hole 285. In some embodiments, the second recessed portion 280 is recessed so that a portion of a top cap of a bolt may fit within the second recessed portion 280.

In several embodiments, the first through-hole 270 is the same size as the second through-hole 285. In other embodiments, the first through-hole 270 is a different size than the second through-hole 285. In one or more embodiments, the first through-hole 270 is smaller than the third through-hole 275. In some embodiments, the first through-hole 270 is sized to fit a bolt such as the one or more bolts 225. In one or more embodiments, a bolt such as the one or more bolt is inserted into the first through-hole 270 (from the front view 240) and tightened to secure the energy absorption spacer 185 from the frame 175.

In some embodiments, the second through-hole 285 is smaller than the third through-hole 275. In some embodiments, the second through-hole 285 is sized to fit a bolt such as the one or more bolts 225. In one or more embodiments, a bolt such as the one or more bolt is inserted into the second through-hole 285 (from the front view 240) and tightened to secure the energy absorption spacer 185 from the frame 175.

In several embodiments, the third through-hole 275 is larger than the first through-hole 270 and the second through-hole 285. In some embodiments, the third through-hole 275 is configured to fit over a portion of the frame 175. In some embodiments, a portion of the frame 175 interlocks with the third through-hole 275. In one or more embodiments, the third through-hole 275 is omitted. In several embodiments, the third through-hole 275 extends from the first portion 245 to the second portion 250 along the third portion 255. In one or more embodiments, the third through-hole extends the length of the third portion 255 along the length 260. In some embodiments, the second through-hole 285 is sized to fit a bolt such as the one or more bolts 225. In one or more embodiments, a bolt such as the one or more bolt is inserted into the second through-hole 285 (from the front view 240) and tightened to secure the energy absorption spacer 185 from the frame 175.

In one or more embodiments, the first upper edge 295 and the second upper edge 300 both have a negative slope. In some embodiments, the slope of the second upper edge 300 is greater than the first upper edge 295. In some embodiments, the second upper edge 300 contacts the first bottom edge 305. In some embodiments, the first upper edge 295 contacts the first bottom edge 305. In one or more embodiments, the third bottom edge 315 contacts the second upper edge 300. In some embodiments, a seat trim cover such as the seat trim cover 215 would extend along the first upper edge 295. In various embodiments, a seat trim cover such as the seat trim cover 215 would extend along the first upper edge 295 and along the first bottom edge 305. In one or more embodiments, a seat garnish such as seat garnish 180 would extend over the seat trim cover along the first upper edge 295 and/or along the first bottom edge 305. In one or more embodiments, the first upper edge 295 is the trim guide of the energy absorption spacer 185. In some embodiments, the first upper edge 295 and the first bottom edge 305 form the trim guide. In one or more embodiments, the first bottom edge 305 is omitted and the first upper edge 295 extends to the second bottom edge 310. In one or more embodiments, the first bottom edge 305 is omitted and the second upper edge 300 extends to the second bottom edge 310.

In one or more embodiments, the first plurality of protrusions 325 include the same number of protrusions as the second plurality of protrusions 330. In other embodiments, the first plurality of protrusions 325 include a different number of protrusions than the second plurality of protrusions 330. In various embodiments, the first plurality of protrusions 325 include only one protrusion. In some embodiments, the first plurality of protrusions 325 include six protrusions. In one or more embodiments, the first plurality of protrusions 325 include two, three, four, or more protrusions. In one or more embodiments, the first plurality of protrusions 325 are different size, shape, angle, or orientation than shown in FIGS. 8-11, so long as the first plurality of protrusions 325 are tuned to appropriately absorb energy, as described herein. In some embodiments, one side of the first plurality of protrusions 325 have the same slope as the first upper edge 295 and/or trim guide. In one or more embodiments, one or more protrusions of the first plurality of protrusions 325 follows a same route as the first upper edge 295.

In various embodiments, the second plurality of protrusions 330 include only one protrusion. In some embodiments, the second plurality of protrusions 330 include six protrusions. In one or more embodiments, the second plurality of protrusions 330 include two, three, four, or more protrusions. In one or more embodiments, the second plurality of protrusions 330 are different size, shape, angle, or orientation than shown in FIGS. 8-11, so long as the second plurality of protrusions 330 are tuned to appropriately absorb energy, as described herein. In some embodiments, one side the second plurality of protrusions 330 have the same slope as the first upper edge 295 and/or trim guide. In one or more embodiments, one or more protrusions of the second plurality of protrusions 330 follows a same route as the first upper edge 295.

In some embodiments, the third recessed portion 340 is shaped like a semi-circle. In several embodiments, the third recessed portion 340 includes one or more sloped edges. In one or more embodiments, the sloped edges of the third recessed portion 340 have a different slope than edges of the first recessed portion 265, the second recessed portion 280, and/or the fourth recessed portion 345. In other embodiments, the third recessed portion 340 is shaped as an oval, polygon, or the like. In yet other embodiments, the third recessed portion 340 is not recessed and is level with the remainder of the energy absorption spacer 185. In some embodiments, the third recessed portion 340 is identical in size, shape, and/or orientation to the fourth recessed portion 345. In various embodiments, the third recessed portion 340 is identical in size, shape, and/or orientation to the first recessed portion 265. In one or more embodiments, the third recessed portion 340 mirrors the fourth recessed portion 345. In some embodiments, the third recessed portion 340 is the same shape as the first recessed portion 265 and/or the second recessed portion 280. In one or more embodiments, the third recessed portion 340 is less recessed (e.g., has a smaller depth) than the first recessed portion 265. In some embodiments, the third recessed portion 340 is recessed so that a nut and/or a washer may fit entirely within the third recessed portion 340. In some embodiments, the third recessed portion 340 is recessed so that a portion of a nut and/or a washer may fit within the third recessed portion 340.

In various embodiments, the fourth recessed portion 345 is shaped like a semi-circle. In several embodiments, the fourth recessed portion 345 includes one or more sloped edges. In one or more embodiments, the sloped edges of the fourth recessed portion 345 have a different slope than edges of the first recessed portion 265, the second recessed portion 280, and/or the third recessed portion 340. In other embodiments, the fourth recessed portion 345 is shaped as an oval, polygon, or the like. In yet other embodiments, the fourth recessed portion 345 is not recessed and is level with the remainder of the energy absorption spacer 185. In some embodiments, the fourth recessed portion 345 is identical in size, shape, and/or orientation to the second recessed portion 280. In one or more embodiments, the fourth recessed portion 345 mirrors the third recessed portion 340. In some embodiments, the fourth recessed portion 345 is the same shape as the first recessed portion 265 and/or the second recessed portion 280. In one or more embodiments, the fourth recessed portion 345 is less recessed (e.g., has a smaller depth) than the second recessed portion 280. In several embodiments, the fourth recessed portion 345 is recessed so that a nut and/or a washer may fit entirely within the fourth recessed portion 345. In some embodiments, the fourth recessed portion 345 is recessed so that a portion of a nut and/or a washer may fit within the fourth recessed portion 345.

FIGS. 8-11 may illustrate, for example, portions of the vehicle 100 of FIG. 1, the system 140 of FIG. 2, the system 155 of FIG. 3, portions of the front row seat 170 of FIGS. 4-7 and may include various components shown in FIGS. 1-7 such as the driver seat 125a, the front row passenger seat 125b, the energy absorption spacer 135, and the energy absorption spacer 185.

Figure 12:
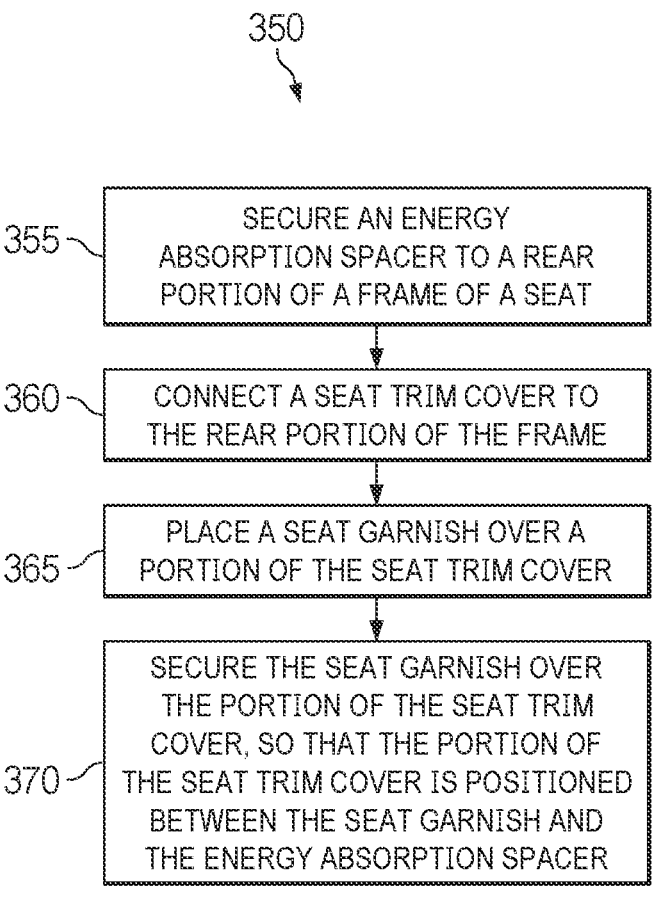
FIG. 12 is a flow-chart of a method of manufacturing the vehicle seat with an energy absorption spacer with an integrated seat trim cover support in accordance with one or more embodiments.

With continuing reference to FIGS. 1-11, a method 350 for securing a seat trim cover between an energy absorption spacer and a seat garnish according to one or more embodiments, as shown in FIG. 12. Method 350 is illustrated as a set of operations or blocks 355 through 370 and is described with continuing reference to FIGS. 1-11. Not all of the illustrated blocks 355 through 370 may be performed in all embodiments of method 350. One or more blocks that are not expressly illustrated in FIG. 12 may be included before, after, in between, or as part of the blocks 355 through 370.

In an example embodiment, the method 350 includes: securing an energy absorption spacer to a rear portion of a frame of a seat at a block 355; connecting a seat trim cover to the rear portion of the frame at a block 360; placing a seat garnish over a portion of the seat trim cover at a block 365; and securing the seat garnish over the portion of the seat trim cover, so that the portion of the seat trim cover is positioned between the seat garnish and the energy absorption spacer at a block 370.

In some embodiments, the block 355 occurs prior to the block 360. In some embodiments, the energy absorption spacer is the energy absorption spacer 135 shown in FIGS. 1-3. In one or more embodiments, the block 355 includes the energy absorption spacer 185. In some embodiments, the energy absorption spacer is installed on a rear portion of a front row seat such as the plurality of front row seats 125. In one or more embodiments, the energy absorption spacer is installed on a rear portion of a steel frame such as frame 175. In one or more embodiments, the energy absorption spacer is installed below a headrest such as the headrest 197 and in between two sides of the frame 175 such as in between a first extended portion 200 and a second extended portion 205. In several embodiments, the energy absorption spacer is placed equidistant from each side of the right and left sides of the frame (such as equidistant from the first extended portion 200 and the second extended portion 205). In some embodiments, at the block 355 the energy absorption spacer is secured via a plurality of bolts such as the one or more bolts 225. In some embodiments, at least a portion of the energy absorption spacer is secured to the frame using a different fastening means. For example, in some embodiments, an opening such as the third through-hole 275 is inserted over a portion of the frame such as frame 175 to couple the frame to the energy absorption spacer.

In one or more embodiments, the block 360 occurs prior to the block 355. In other embodiments, the seat trim cover is coupled to the headrest such as the headrest 197. In one or more embodiments, the seat trim cover is the seat trim cover 215. In some embodiments, the seat trim cover has a first end and a second end. The first end is coupled to the headrest such as headrest 197, and the second end is in direct contact with the frame such as frame 175. In some embodiments, the seat trim cover is coupled to the headrest via stitching, adhesive, pins, or the like at the block 360. In some embodiments, the block 360 includes aligning a portion of the seat trim cover along a trim guide of the energy absorption spacer. In some embodiments, the additional block includes coupling the seat trim cover to the energy absorption spacer along the trim guide. In or more embodiments, the trim guide is the first portion 245 and/or the second portion 250 of the energy absorption spacer 185. In some embodiments, the trim guide is the first upper edge 295 and/or the first bottom edge 305 of the energy absorption spacer 185.

In several embodiments, the block 365 occurs after the blocks 355 and 360. The seat garnish of the block 365 may be the seat garnish 180. The portion of seat trim cover may include the second end of the seat trim cover, in some embodiments. In one or more embodiments, the seat garnish extends over a rear portion of the seat trim cover such as the rear portion of the fixed headrest trim 217 shown in FIG. 5A. The rear portion may include the second end of the seat trim cover. In some embodiments, the block 365 includes placing the seat garnish over the energy absorption spacer.

In one or more embodiments, the block 370 occurs after the blocks 355-365. The block 375 may include using pins to secure the seat garnish over the portion of the trim. The block 375 may include using adhesive to secure the seat garnish over the portion of the trim. The block 375 may include using pins, staples, adhesive, stitching, or the like to couple the seat garnish to the energy absorption spacer to sandwich the portion of the seat trim cover. The block 375 may include using pins, staples, adhesive, stitching, or the like to couple the seat garnish to the portion of the seat trim cover. In some embodiments, the block 370 includes forming the shape of the seat trim cover or at least a portion of the seat trim cover by securing the seat garnish to the energy absorption spacer. In one or more embodiments, the block 370 creates a smooth transition from the seat trim cover to the seat garnish by placing a portion of the seat trim cover underneath the seat garnish and then securing the seat garnish over it.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different blocks, processes, and procedures are described as appearing as distinct acts, one or more of the blocks, one or more of the processes, and/or one or more of the procedures may also be performed in different orders, simultaneously, and/or sequentially. In several example embodiments, the blocks, processes and/or procedures may be merged into one or more blocks, processes, and/or procedures.

In several example embodiments, one or more of the operational blocks in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A; B; or both A and B." The phrase "one or more of the following: A, B, and C" should be understood to mean "A; B; C; A and B; B and C; A and C; or all three of A, B, and C." The phrase "one or more of A, B, and C" should be understood to mean "A; B; C; A and B; B and C; A and C; or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112 (f) for any limitations of any of the claims herein, except for those in which the claim expressly uses the word "means" together with an associated function.

What is claimed is:

1. A seat for a vehicle, comprising:
   a front side; and
   an opposing rear side,
      wherein the rear side comprises:
         at least a portion of a headrest, wherein the headrest forms part of a frame;
         a seat trim cover having a first portion coupled to the portion of the headrest; and
         an energy absorption spacer;
            wherein the energy absorption spacer comprises a trim guide; and
            wherein at least a second portion of the seat trim cover follows the trim guide of the energy absorption spacer such that the second portion of the seat trim cover is in contact with the energy absorption spacer.

2. The seat of claim 1, further comprising:
   a seat garnish positioned over at least the second portion of the seat trim cover and the energy absorption spacer such that the second portion of the seat trim cover is positioned between the seat garnish and the energy absorption spacer.

3. The seat of claim 2, wherein the second portion of the seat trim cover is positioned directly between the seat garnish and the energy absorption spacer along the trim guide.

4. The seat of claim 2, wherein the seat garnish is coupled to the rear side using an adhesive.

5. The seat of claim 1, wherein the energy absorption spacer is coupled to the rear side using one or more bolts.

6. The seat of claim 5, wherein the energy absorption spacer comprises a plurality of protrusions extending away from the trim guide; and wherein the plurality of protrusions of the energy absorption spacer is configured to absorb energy from a head of a user during a collision.

7. The seat of claim 1, further comprising:

a seat garnish coupled to the rear side, wherein the second portion of the seat trim cover is positioned radially inward from the seat garnish.

8. The seat of claim 7, wherein at least a portion of the trim guide of the energy absorption spacer is positioned radially inward from the second portion of the seat trim cover.

9. The seat of claim 7, wherein the energy absorption spacer further comprises a plurality of protrusions; and wherein the plurality of protrusions are positioned radially inward from the seat garnish and the second portion of the seat trim cover.

10. A seat for a vehicle, comprising:

a frame, the frame comprising a headrest portion;

an energy absorption spacer coupled to the frame;

a seat garnish positioned over the energy absorption spacer and the frame; and a seat trim cover, wherein the seat trim cover has a first portion and a second portion;

wherein the first portion of the seat trim cover is coupled to the headrest portion;

and wherein the second portion of the seat trim cover extends between the energy absorption spacer and the seat garnish.

11. The seat of claim 10, wherein the second portion of the seat trim cover extends from the headrest portion and around a portion of the energy absorption spacer.

12. The seat of claim 11, wherein the frame further comprises a first extended portion and a second extended portion; and wherein the headrest portion is positioned in between the first extended portion and the second extended portion.

13. The seat of claim 12, wherein the energy absorption spacer is positioned between the first extended portion and the second extended portion; and wherein the energy absorption spacer is equidistant from the first extended portion and the second extended portion.

14. The seat of claim 12, wherein the energy absorption spacer is positioned beneath the headrest portion.

15. The seat of claim 10, wherein the second portion of the seat trim cover includes an end of the seat trim cover.

16. The seat of claim 15, wherein the end of the seat trim cover is coupled to the frame.

17. The seat of claim 16, wherein the end of the seat trim cover is coupled to the frame via adhesive.

* * * * *